(No Model.) 4 Sheets—Sheet 2.

W. REEVES.
FEED WATER FILTER AND PURIFIER AND GREASE TRAP.

No. 523,486. Patented July 24, 1894.

(No Model.) 4 Sheets—Sheet 4.

W. REEVES.
FEED WATER FILTER AND PURIFIER AND GREASE TRAP.

No. 523,486. Patented July 24, 1894.

UNITED STATES PATENT OFFICE.

WILFRED REEVES, OF LONDON, ENGLAND.

FEED-WATER FILTER AND PURIFIER AND GREASE-TRAP.

SPECIFICATION forming part of Letters Patent No. 523,486, dated July 24, 1894.

Application filed March 1, 1894. Serial No. 501,931. (No model.) Patented in England August 21, 1893, No. 15,821.

*To all whom it may concern:*

Be it known that I, WILFRED REEVES, engineer, a subject of the Queen of Great Britain, residing at London, England, have invented certain new and useful Improvements in and Connected with Feed-Water Filters, Purifiers, and Grease-Catchers, (for which I have obtained a patent in Great Britain, No. 15,821, dated August 21, 1893,) of which the following is a specification, reference being had to the accompanying drawings.

This invention relates to apparatus for filtering and purifying water, that is to say, to apparatus for separating from water any air, grease, metallic oxides and other impurities that may be contained therein.

The said invention is intended more particularly to be applied to the filtering of feed-water for steam boilers, but it may be used equally well for filtering other waters.

According to my invention I pass the water to be filtered under pressure or by gravity through a chamber, or successively through two or more chambers, charged with granular absorbent compounds or materials which extract and remove the impurities during the passage of the water therethrough. I prefer to use sawdust as the filtering medium, and the use of this material in the manner that will be hereinafter described constitutes an important feature of my invention.

I so construct the filter that the absorbent filtering material when saturated with impurities can be discharged from the filter chamber, and the said chamber recharged with fresh material as often as required without stopping or opening the filter.

In the accompanying drawings I have illustrated a filter constructed in accordance with my invention, the same having one filter chamber only which I find is sufficient for most purposes, but it is obvious that I can provide two or more such chambers to be traversed successively by the water.

Figure 1:
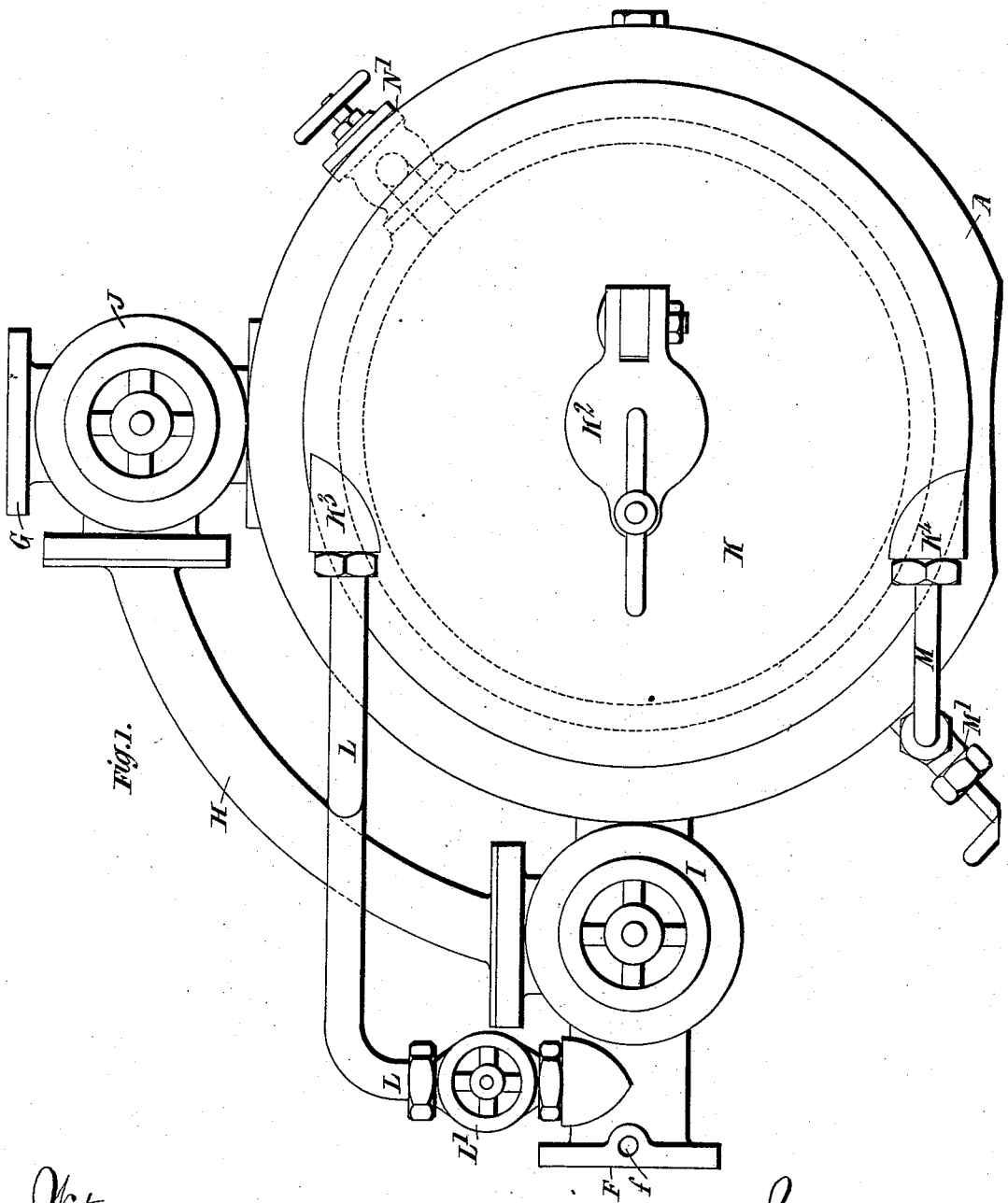
Figure 2:
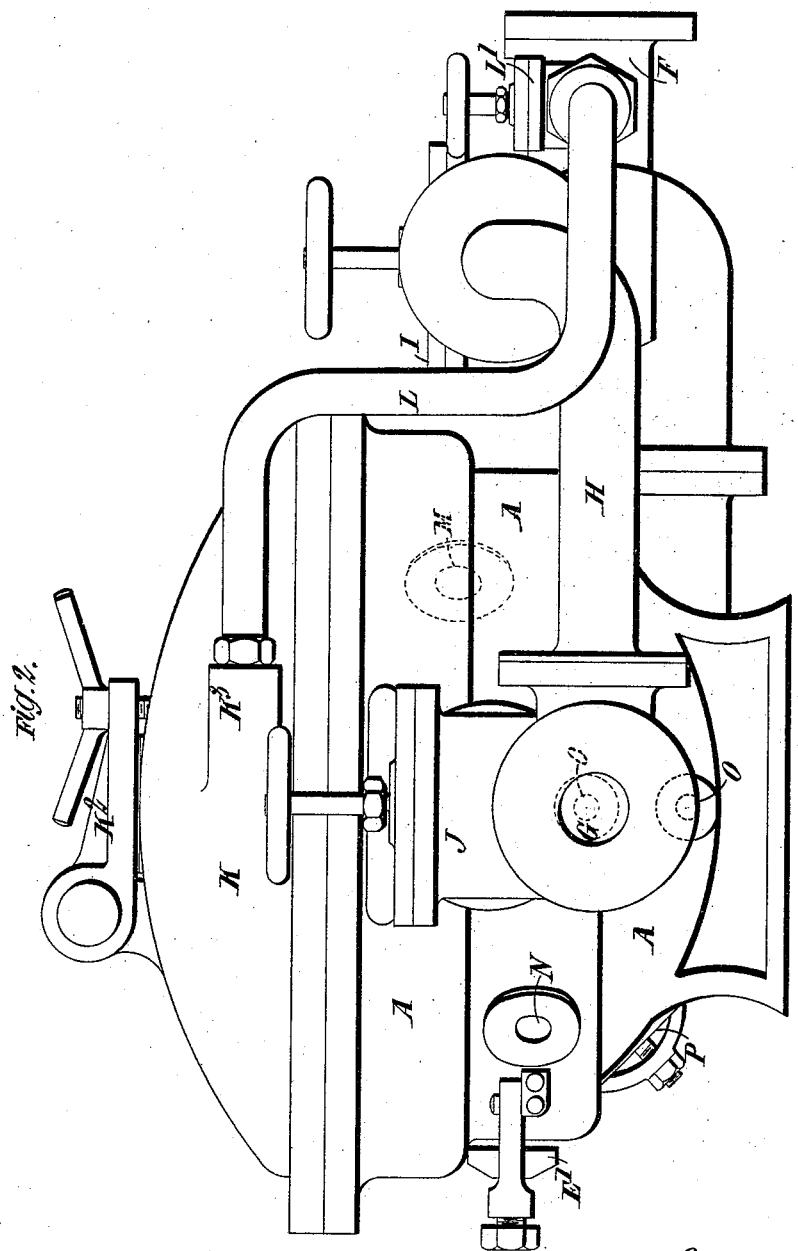
Figure 3:
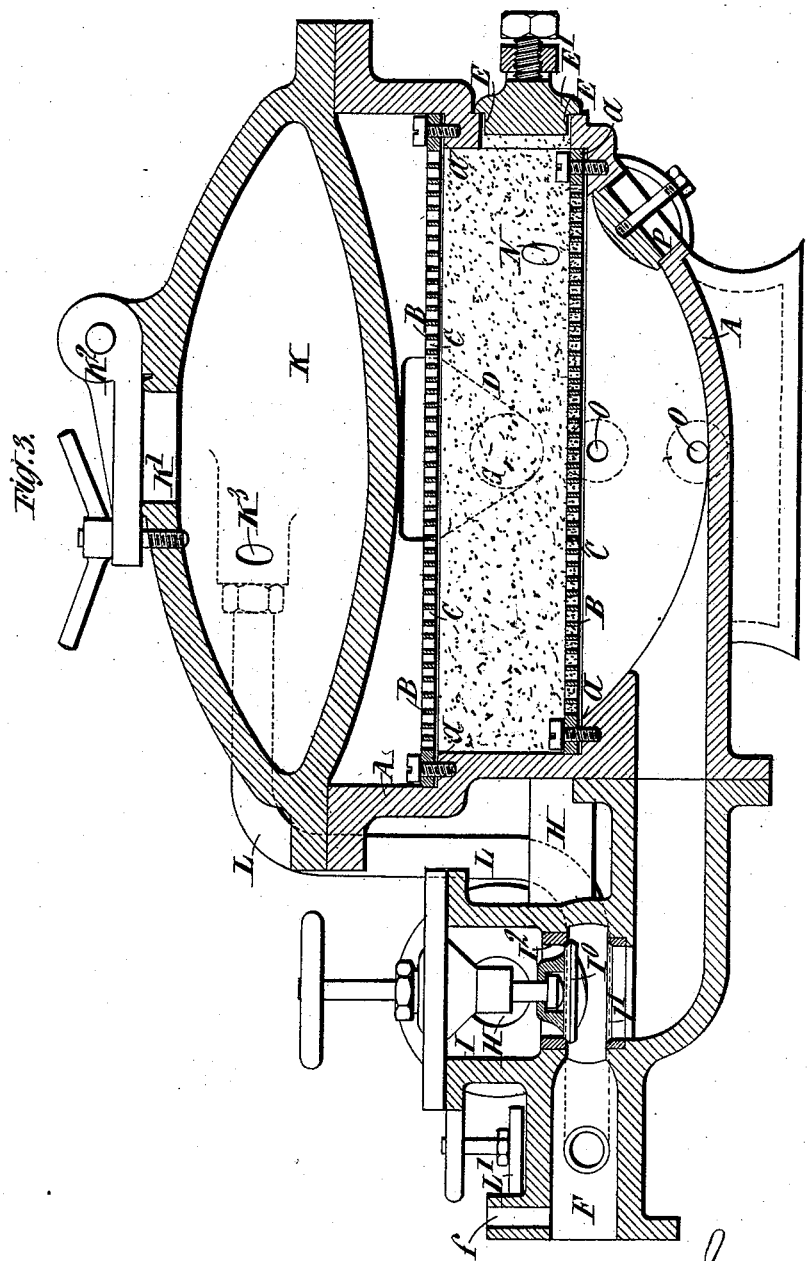
Figure 4:
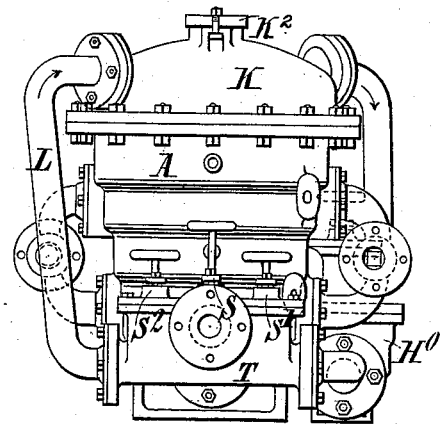
Figure 6:
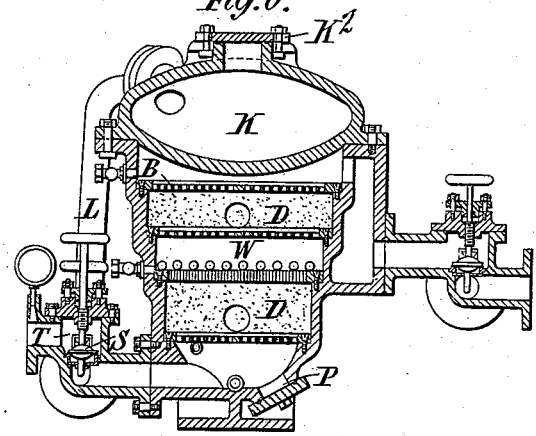
Figure 5:
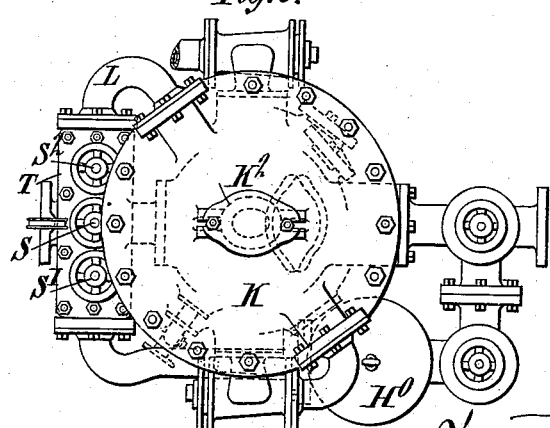

Figure 1 is a plan of the filter. Fig. 2 is an elevation thereof, and Fig. 3 is a vertical central section looking from the side of the filter opposite to that shown in Fig. 2. Fig. 4 is a side elevation, Fig. 5 is a plan, and Fig. 6 is a central section showing a filter with two filter chambers, and an intermediate chamber for receiving zinc balls hereinafter referred to.

Like letters denote corresponding parts in all the figures.

A is the case or shell of the filter, the same being preferably cylindrical in form. It may be constructed to stand vertically or horizontally or inclined.

B, B, Fig. 3 are two strong removable grids resting upon shoulders $a$ provided in the casing and bolted or otherwise suitably secured thereto. The space between the said grids and the casing is the filter chamber.

Immediately beneath each grid is secured a wire gauze sheet C, or wire cloth of fine mesh to prevent large particles of matter from traversing the filter chamber. The said chamber is filled with a granular absorbent filtering material D preferably sawdust which I find to be very suitable for the purpose. E is a hand hole, provided to allow of cleaning the filter chamber and through which the said chamber can be charged with the sawdust or other filtering material. E'. is a door for closing said hand hole. The filtering medium can however be discharged from the filter chamber and be replaced by fresh material without opening the filter chamber as will be hereinafter explained.

F is the inlet for unfiltered water.

G is the outlet for filtered water.

I provide for shutting off the filter without interfering with the flow of the liquid as follows, that is to say, I provide a by-pass H which forms outside the filter a communication between the inlet and outlet pipes F, G.

I is a valve casing in the inlet pipe F which casing contains a valve proper $I^0$ that can be screwed down to bed on a seat $I'$ to close the inlet to the filter, and can be screwed up to bed on another seat $I^2$ to close the by-pass H. When the valve is in the position to close the inlet to the filter, the by-pass H is open, and when it is in the position to close the by-pass H the inlet to the filter is open.

J is a stop valve in the outlet pipe G but above the connection between the pipes G and H so that when said valve is shut there is still a free communication between the said pipes G, H. By shutting down the valve $I^0$ on to the seat $I'$ and then closing the valve J the filter is cut out, but the flow of the liquid is not stopped it being then free to travel through the by-pass H from the inlet F to the outlet G. I prefer to provide a small filter chamber H⁰ Figs. 4 and 5 charged with filtering material in the by-pass H so that when the water is passing through the said by-pass during such time as the filter is being recharged it is still being filtered. I also in some cases in lieu of the one valve I⁰ working against two seats I', I² provide three valves S, S', S² see Figs. 4, 5, and 6 leading respectively to the filter, the by pass, and the blow through, from a common chamber T to which the water is first conducted. A stop valve is provided in the feed pipe. It is obvious that cocks may be substituted for valves when desired.

K is a reservoir formed in the case A, and having a capacity equal to at least one charge of absorbent material used in the filter chamber. K' is a charging opening closed by a door K². Said chamber may be furnished with a drain cock. It is provided with an inlet K³ and an outlet K⁴ the former being connected by a pipe L with the inlet pipe F and the other being connected by a pipe M with the filter chamber, said pipe M entering said chamber near the top thereof and being controlled by a suitable influx valve M'. On the side of the filter chamber opposite to the mouth of the pipe M and near the bottom thereof is an efflux opening N controlled by a suitable valve N'. The pipe L is also furnished with a stop valve L'.

When the absorbent filtering material becomes saturated with the impurities it is readily removed by a cross current of water or steam or by opening the efflux valve N', the influx valve M' and the valve L' which allows the water to flow through the reservoir K and the filter chamber, and out by the efflux N carrying the filtering material with it. As soon as all the filtering material is discharged, which can be seen by watching the efflux orifice, the valves L', N' are closed and then a fresh charge of absorbent material is introduced into the reservoir K through the charging opening K'. The charging door K² is then shut and fastened, and the valve L' is opened again whereupon the absorbent material is carried into the filter chamber, and retained therein by the gauze sheets C, C while the water passes away through the outlet G. When re-charging is completed, the valve L' is shut down and the filtering is allowed to proceed as before.

I prefer to provide a pressure gage at $f$ in the inlet pipe F. The gage will indicate when the filter chamber is fully charged.

If desired, the absorbent filtering material may be removed or replenished through the hand hole E.

The inlet pipe F is also preferably fitted with a relief valve, of any ordinary construction, and the outlet pipe with a self-acting air-escape valve.

The lower part of the filter case is furnished with drain openings O, O fitted with suitable cocks and is also furnished with a handhole P to admit of cleaning.

The operation of my improved filter is as follows, that is to say, assuming the filter is charged, the influent water passes into the filter and through the first gauze partition C and permeates the filtering material D in the filter chamber, which material absorbs the grease and other impurities; the filtered water passes off through the second gauze partition and out by the outlet G.

In cases where more than one filter chamber is provided as in Figs. 4, 5 and 6, the intermediate spaces serve as settling tanks, and the matter which settles therein is drawn off by suitable drain cocks. These spaces may also be fitted with steam or water cocks for scouring purposes. I moreover provide in some cases between two saw-dust chambers, or above the saw-dust chamber when only one such is used a chamber W Fig. 6 containing a number of small compressed zinc balls. These balls have the effect of taking up any free acid contained in the water passing through the chamber. I prefer to use one layer of balls only so that the same can roll about freely and by rubbing against each other can keep their surfaces bright. The presence of these balls has the effect of neutralizing any free acid there may be in the water.

What I claim is—

1. In a filter, the combination of a filter chamber a reservoir for receiving new charges of filtering material, a charging door for said reservoir, a communicating thoroughfare between said filter chamber and reservoir, and another thoroughfare independent of the filter chamber between the reservoir and the inlet pipe of the filter, substantially as described for the purpose specified.

2. In a filter, the combination of a filter chamber having its influx and efflux sides formed by strong grids covered on that side which faces the flow of the liquid with gauze or the like of fine mesh, and filled with absorbent filtering material, a reservoir for receiving new charges of filtering material, a charging door for said reservoir, a communicating thoroughfare between said filter chamber and reservoir, and another thoroughfare independent of the filter chamber between the reservoir and the inlet pipe of the filter, substantially as described for the purpose specified.

3. In a filter, the combination of a filter chamber, having its influx and efflux sides formed by strong grids covered on that side which faces the flow of the liquid with gauze or the like of fine mesh and filled with absorbent filtering material, a reservoir for receiving new charges of filtering material, a charging door for said reservoir, a communicating thoroughfare between said filter chamber and reservoir, another thoroughfare independent of the filter chamber between the reservoir and the inlet pipe of the filter, a by-pass communicating with the inlet and outlet pipes of the filter, and a filter chamber in said by-pass, substantially as described.

4. In a filter, the combination of a filter chamber having its influx and efflux sides formed by strong grids covered on that side which faces the flow of the liquid with gauze or the like of fine mesh and filled with absorbent filtering material, a reservoir for receiving new charges of filtering material, a charging door for said reservoir, a communicating thoroughfare between said filter chamber and reservoir, another thoroughfare independent of the filter chamber between the reservoir and the inlet pipe of the filter, a chamber containing a layer of zinc balls situated below said filter chamber, a by-pass communicating with the inlet and outlet pipes of the filter, and a filter chamber in said by-pass, substantially as described and for the purpose specified.

In testimony whereof I have hereunto set my hand this 15th day of February, 1894.

WILFRED REEVES.

Witnesses:
GEORGE HARRISON,
ARTHR. A. BERGIN.